(12) United States Patent
Liu et al.

(10) Patent No.: US 7,940,519 B2
(45) Date of Patent: May 10, 2011

(54) PORTABLE ELECTRONIC APPARATUS

(75) Inventors: Wen-Chou Liu, Taipei (TW); Hsien-Tang Liao, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 64 days.

(21) Appl. No.: 12/111,977

(22) Filed: Apr. 30, 2008

(65) Prior Publication Data
US 2008/0298002 A1 Dec. 4, 2008

(30) Foreign Application Priority Data
Jun. 4, 2007 (TW) ................................ 96119910 A

(51) Int. Cl.
H05K 7/14 (2006.01)

(52) U.S. Cl. ............... 361/679.21; 361/679.26; 248/917

(58) Field of Classification Search ............. 361/679.21, 361/679.02, 679.26, 679.09; 349/58–60; 248/917–924
See application file for complete search history.

(56) References Cited

U.S. PATENT DOCUMENTS

| | | | |
|---|---|---|---|
| 5,486,942 A * | 1/1996 | Ichikawa et al. ............... 349/58 |
| 6,034,751 A * | 3/2000 | Kamiya ........................... 349/60 |
| 6,061,231 A * | 5/2000 | Crockett .................. 361/679.26 |
| 6,724,445 B2 | 4/2004 | Natsuyama | |
| 6,741,298 B1 * | 5/2004 | Won .................................. 349/58 |
| 6,871,138 B1 * | 3/2005 | Minelli .......................... 701/200 |
| 6,909,475 B2 | 6/2005 | Kojima et al. | |
| 7,126,651 B2 | 10/2006 | Kim et al. | |
| 2001/0035921 A1 * | 11/2001 | Yamanami ..................... 349/58 |
| 2006/0034041 A1 | 2/2006 | Lo et al. | |
| 2006/0061947 A1 | 3/2006 | Chang et al. | |
| 2006/0187143 A1 | 8/2006 | Cho et al. | |

FOREIGN PATENT DOCUMENTS

| | | |
|---|---|---|
| CN | 2546909 | 4/2003 |
| CN | 1456924 | 11/2003 |

OTHER PUBLICATIONS

"1st Office Action of China counterpart application", issued on Sep. 4, 2009, p. 1-7.

* cited by examiner

Primary Examiner — Jayprakash N Gandhi
Assistant Examiner — Ingrid Wright
(74) Attorney, Agent, or Firm — Jianq Chyun IP Office

(57) ABSTRACT

A portable electronic apparatus including a host and a display unit pivotally connected to the host is provided. The display unit includes a panel module, a first plate having a plate body and a plurality of positioning structures provided on the plate body, and a second plate. The panel module is locked at the first plate by the positioning structures and tightly fits with the first plate. The second plate is connected to the first plate, and the panel module is held between the first plate and the second plate.

12 Claims, 6 Drawing Sheets

PORTABLE ELECTRONIC APPARATUS

CROSS-REFERENCE TO RELATED APPLICATION

This application claims the priority benefit of Taiwan application serial no. 96119910, filed on Jun. 4, 2007. The entirety of the above-mentioned patent application is hereby incorporated by reference herein and made a part of specification.

BACKGROUND OF THE INVENTION

1. Field of the Invention

The invention relates to an electronic apparatus and, more particularly, to a portable electronic apparatus.

2. Description of the Related Art

In the information age nowadays, the dependence of people on electronic products is increasing day by day. To satisfy the demands, such as to have high speed, high efficiency, and to be light, slim and miniature for the electronic products, portable apparatuses such as notebooks, have gradually become the mainstream.

FIG. 1A is a schematic diagram showing a conventional portable electronic apparatus. FIG. 1B is a schematic diagram showing the display unit, whose front cover is removed, of the portable electronic apparatus shown in FIG. 1A. Please refer to FIG. 1A and FIG. 1B simultaneously. The portable electronic apparatus 100 includes a host 110 and a display unit 120 pivotally connected to the host 110. In conventional technology, the display unit 120 mainly includes a back cover 122, a front cover 124, and a panel module 126. Wherein, a metal positioning support 128 will be provided at two sides of the panel module 126, and the panel module 126 can be assembled on the back cover 122 by the positioning support 128.

In the conventional technology, the positioning support 128 is assembled at two sides of the panel module 126 by a plurality of fasteners 130 such as screws. The combination of the positioning support 128 and the panel module 126 is also assembled on the back cover 122 by a plurality of fasteners 140. Therefore, it will cost more time to assemble the display unit 120 and reduce the assembly efficiency of the portable electronic apparatus 100. Furthermore, since the metal costs more, using positioning support 128 and a plurality of fasteners 130, 140 extra to assemble the panel module 126 on the display unit 120 increases the product cost of the portable electronic apparatus 100.

BRIEF SUMMARY OF THE INVENTION

The invention provides a portable electronic apparatus with better assembly efficiency and lower product cost.

The invention provides a portable electronic apparatus including a host and a display unit pivotally connected to the host. The display unit includes a panel module, a first plate having a plate body and a plurality of positioning structures provided on the plate body, and a second plate. The panel module is locked at the first plate by the positioning structures and tightly fits with the first plate. The second plate is connected to the first plate, and the panel module is held between the first plate and the second plate.

In the portable electronic apparatus, a plurality of positioning structures are provided on the first plate of the display unit, so that the panel module can be locked on the first plate by the positioning structures and tightly fit with the first plate. Compared with the conventional technology that the positioning support at two sides of the panel module are assembled by screws and then fasten the combination of the positioning support and the panel module to the back cover, the display unit of the invention can save fastening time effectively to increase the assembly efficiency.

In addition, since the invention using locking structure relationship to make the display unit tightly fit with the first plate, the display unit of the invention can assemble the panel module at the display unit without extra positioning support and fasteners. Therefore, the product cost of the portable electronic apparatus of the invention is lower.

These and other features, aspects, and advantages of the present invention will become better understood with regard to the following description, appended claims, and accompanying drawings.

DETAILED DESCRIPTION OF THE EMBODIMENTS

Figure 1A:
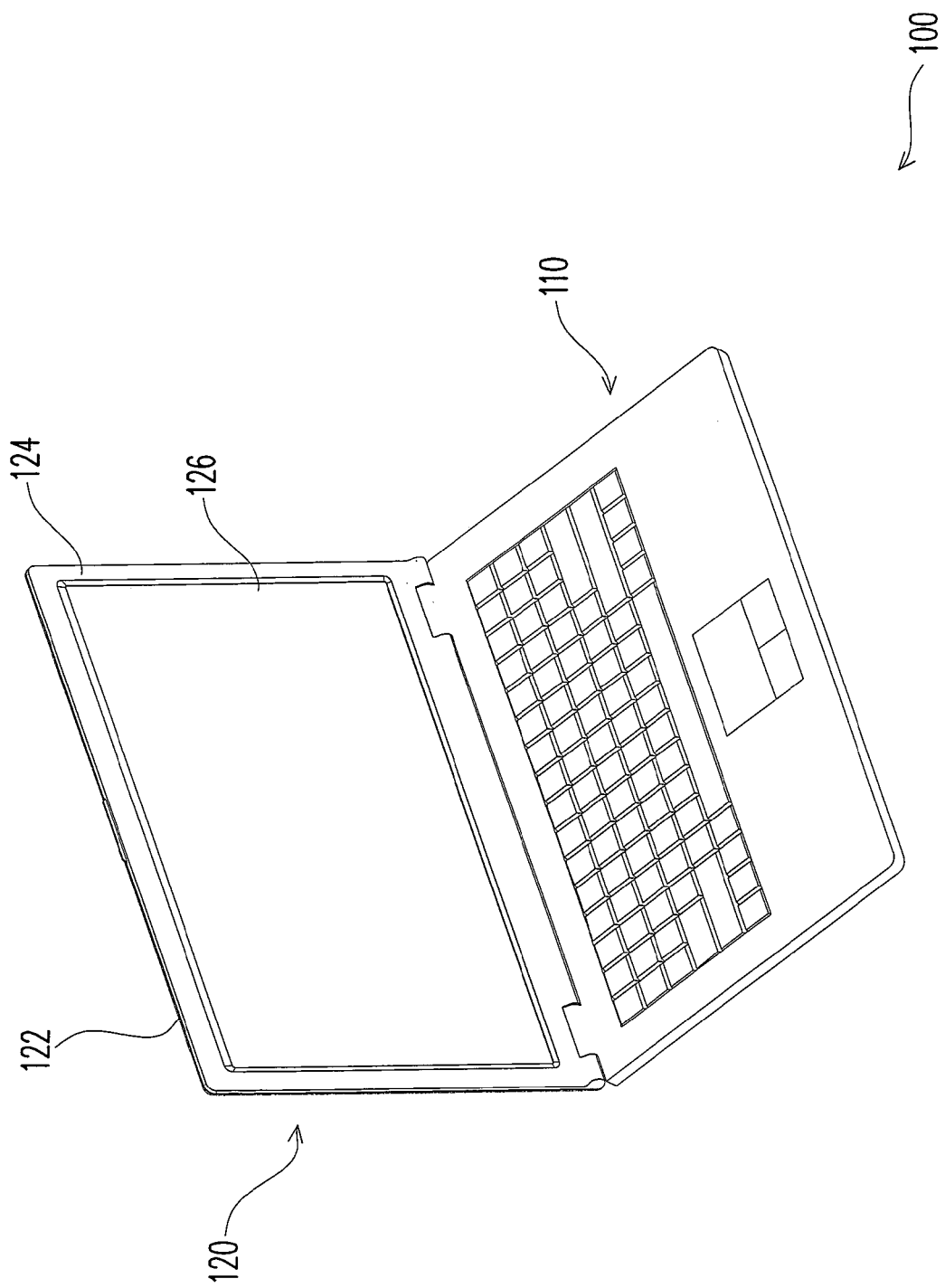
FIG. 1A is a schematic diagram showing a conventional portable electronic apparatus.
Figure 1B:
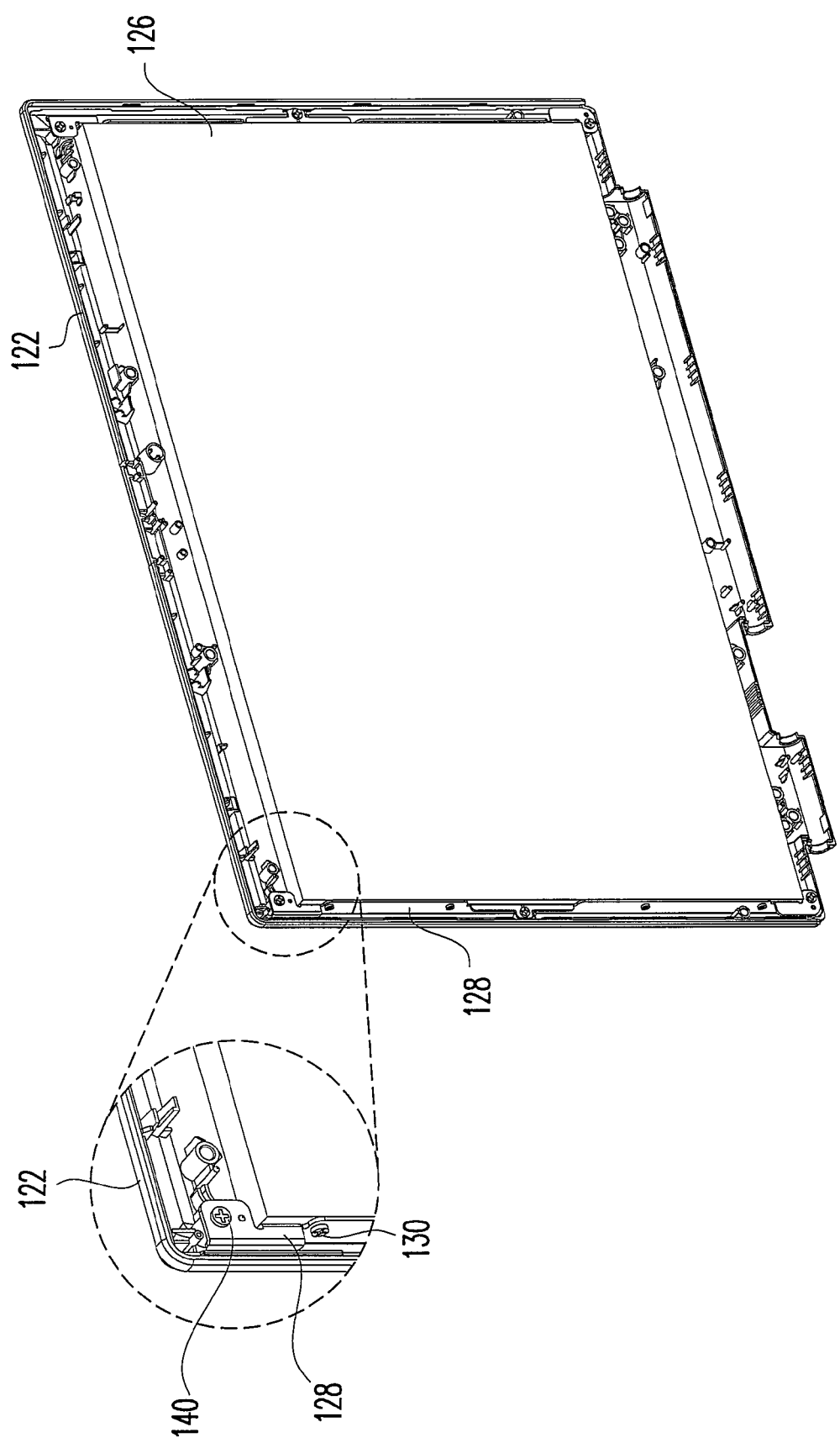
FIG. 1B is a schematic diagram showing the display unit, whose front cover is removed, of the portable electronic apparatus shown in FIG. 1A.
Figure 2A:
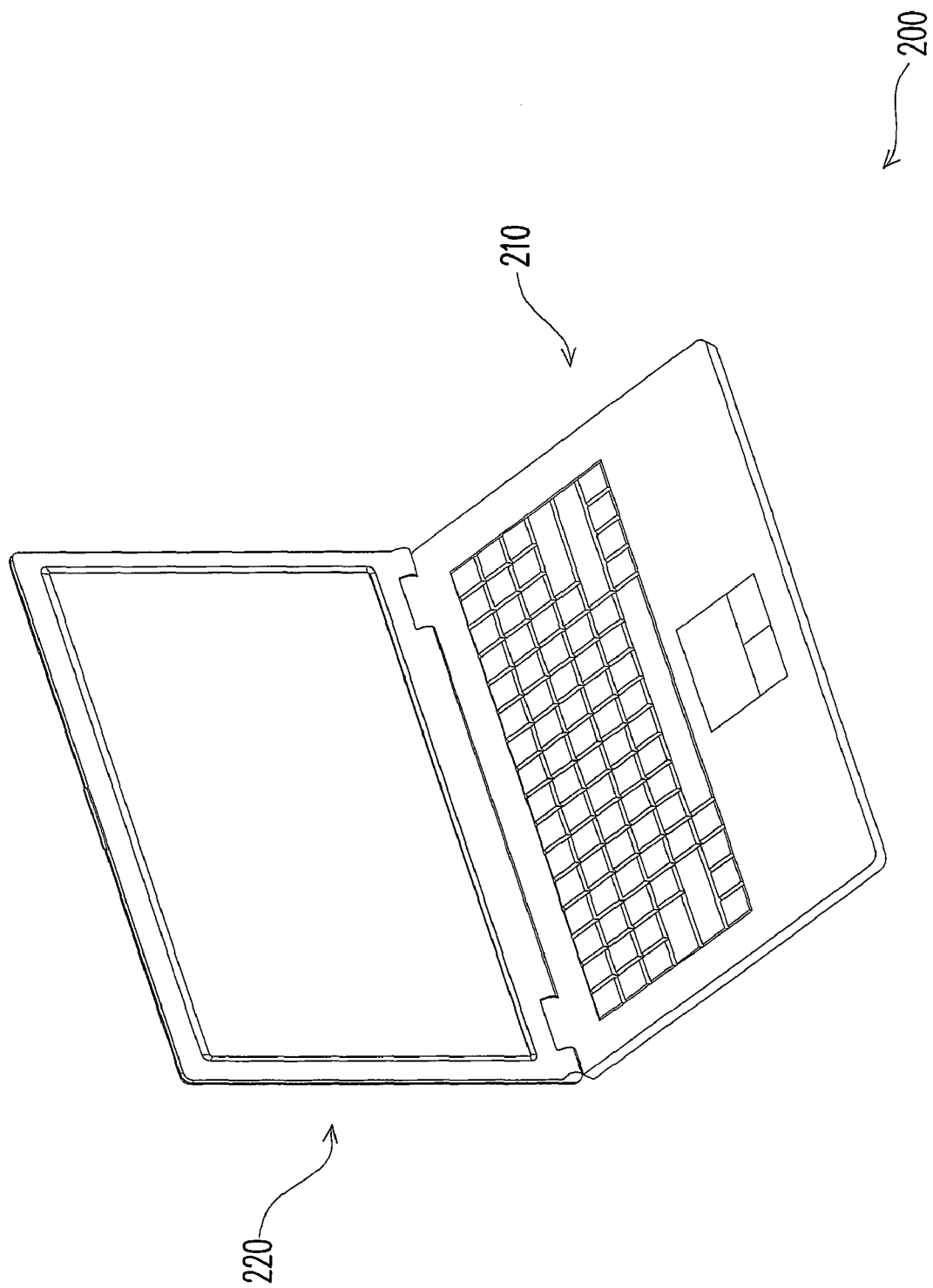
FIG. 2A is a schematic diagram showing a portable electronic apparatus of an embodiment of the invention.
Figure 2B:
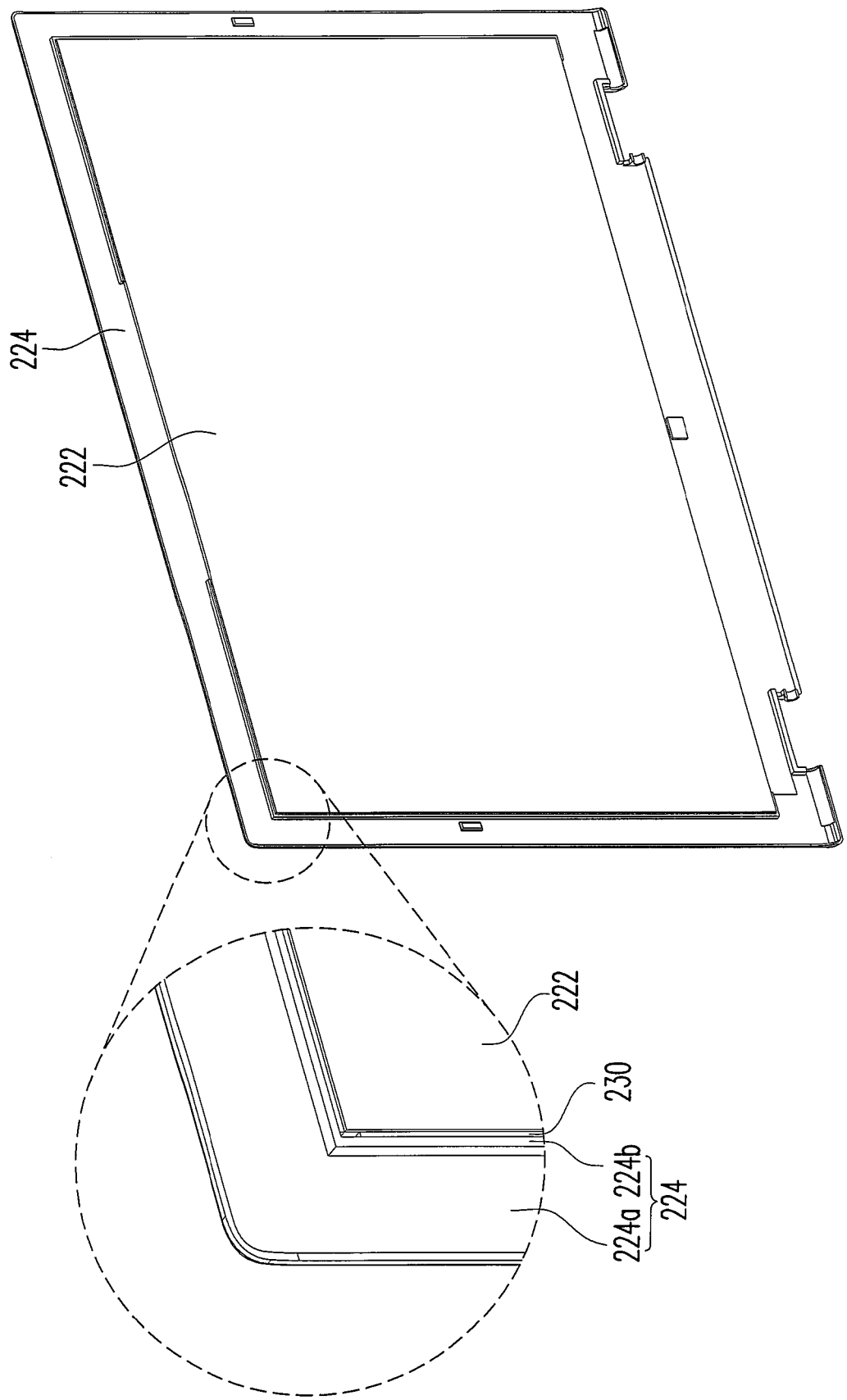
FIG. 2B is a schematic diagram showing the display unit shown in FIG. 2A after its second plate being moved.
Figure 2C:
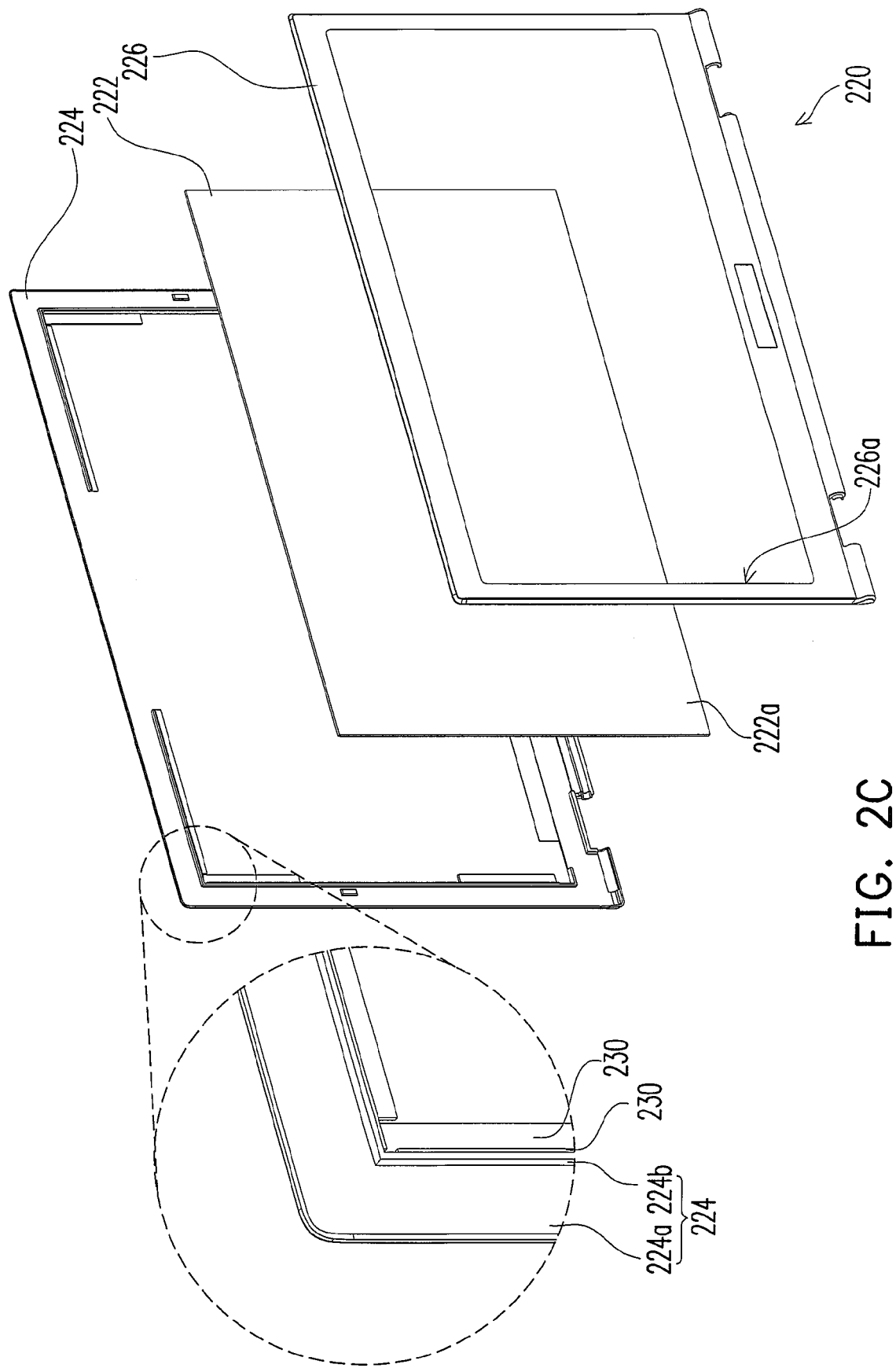
FIG. 2C is an exploded diagram showing the display unit shown in FIG. 2A.

FIG. 2A is a schematic diagram showing a portable electronic apparatus of an embodiment of the invention. FIG. 2B is a schematic diagram showing the display unit shown in FIG. 2A after its second plate being moved. FIG. 2C shows the exploded diagram of the display unit shown in FIG. 2A.

Please refer to FIG. 2A, FIG. 2B, and FIG. 2C simultaneously. The portable electronic apparatus 200, such as a notebook, of the embodiment includes a host 210 and a display unit 220 pivotally connected to the host 210. In the embodiment, the display unit 220 mainly includes a panel module 222, a first plate 224, and a second plate 226. Wherein, the second plate 226 is suitable to be connected to the first plate 224 to hold the panel module 222 between the first plate 224 and the second plate 226. For example, the second plate 226 of the embodiment has an opening 226a, and the panel module 222 has a display area 222a exposed from the opening 226a for users to watch.

Before the second plate 226 and the first plate 224 are connected with each other to hold the panel module 222, in the embodiment, the panel module 222 is locked on the first plate 224, such as a back cover, in a tight-fitting manner. Then, the second plate 226, such as a front cover, is covered on the first plate 224 to enable the panel module 222 be provided in the display unit 220 firmly. In details, the first plate 224 of this embodiment is composed of a plate body 224a and a plurality of positioning structures 224b provided on the plate body 224a. When the panel module 222 is provided at the first plate 224, the positioning structures 224b on the first plate 224 can lock the panel module 222 on the first plate 224 effectively to make the panel module 222 tightly fit with the first plate 224.

From above, the panel module 222 of the embodiment, such as a liquid crystal panel module, is constructed of a liquid crystal panel and a back light module. The material of the first plate 224 can be plastic, and the first plate 224 is formed by the injection molding method. The positioning structures 224b are integrally formed on the plate body 224a. On the other hand, in the embodiment, to avoid the panel module 222 provided in the display unit 220 being impacted by improper external force in use, a plurality of buffer elements 230 are provided at the contact surfaces between the positioning structures 224b and panel module 222 and the contact surface between the first plate 224 and panel module 222 to absorb the shock between the first plate 224 and the panel module 222, and further to obtain a shock avoiding effect. The buffer elements 230 can be proper elastic material, such as foam layers.

The buffer elements 230 provided between the positioning structures 224b and the panel module 222 also can make the connection between the positioning structures 224b and the panel module 222 preferred. In detail, when the panel module 222 is provided at the first plate 224, the panel module 222 presses the buffer elements 230 on the positioning structures 224b, and then the buffer elements 230 exerts an elastic force on the panel module 222 relatively to the positioning structures 224b to hold the panel module 222 at the first plate 224 more effectively.

In the embodiment, the first plate 224 is plastic, but in other embodiments, the first plate 224 also can be metal. In detail, the plate body 224a can be a metal plate, and the metal positioning structures 224b can be provided at the plate body 224a by welding.

Figure 3:
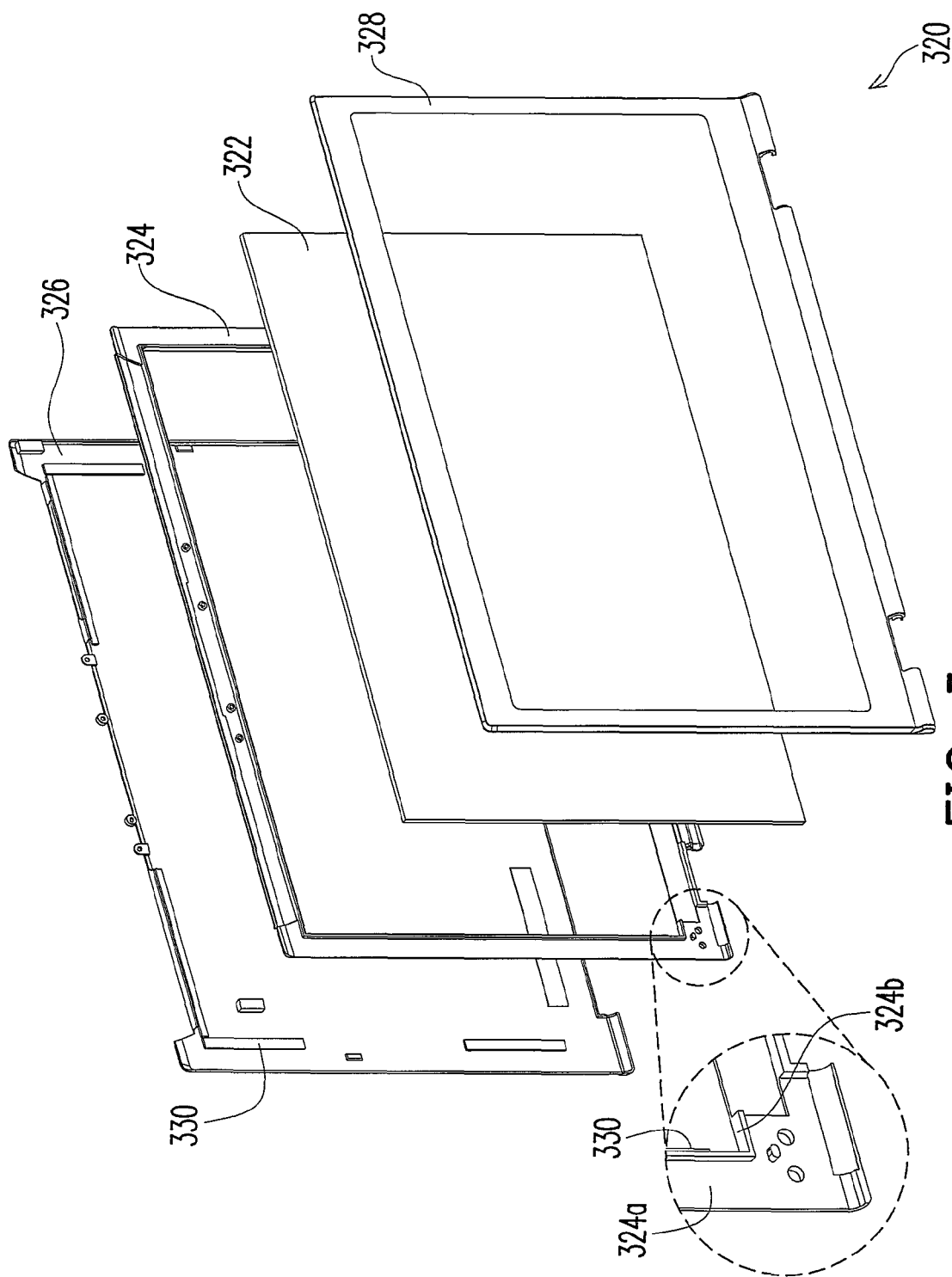
FIG. 3 is an exploded diagram showing the display unit of another embodiment of the invention.

FIG. 3 is an exploded view of the display unit of another embodiment of the invention. Please refer to FIG. 3. In the embodiment, the display unit 32 includes a panel module 322, a first plate 324, a second plate 326, and a third plate 328. For example, the panel module 322 of the embodiment is a liquid crystal panel module, the first plate 324 is a positioning plate, the second plate 326 is a back cover, and the third plate 328 is a front cover. This embodiment is the same as the display unit 220 of the above embodiment. The first plate 324 of this embodiment is also composed of a plate body 324a and a plurality of positioning structures 324b provided on the plate body 324a. The panel module 322 is locked at the first plate 324 by the positioning structures 324b and tightly fits with the first plate 324.

The combination of the panel module 322 and the first plate 324 is provided at the second plate 326, such as a back cover. The third plate 328 is like a front cover to connect with the second plate 326, and the purpose is to hold the combination of the panel module 322 and the first plate 324 between the second plate 326 and the third plate 328. Certainly, in the embodiment, a plurality of buffer elements 330 such as foam layers also can be provided at the contact surfaces between the positioning structures 324b and the panel module 322 and the contact surface between the second plate 326 and the panel module 322 to avoid the panel module 322 of the display unit 320 being impacted by improper external force in use.

In the embodiment, the first plate 324, such as the positioning plate, is a plastic plate, and the positioning structures 324b of the first plate 324 are integrally formed on the plate body 324a. The second plate 326, such as the back plate, is a metal plate, and the combination of the panel module 322 and the first plate 324 can be fastened at the second plate 326 by pasting.

To sum up, in the invention, a plurality of positioning structures are provided on the first plate of the display unit to lock the panel module on the first plate and make the panel module tightly fit with the first plate, so that the panel module can be provided in the display unit firmly. Compared with the conventional technology that assembling the positioning support at two sides of the panel module by screws and then fixing the combination of the positioning support and the panel module to the back cover, the invention has following advantages:

first, since the invention utilizes the locking structure relationship to make the panel module tightly fit on the first plate, the assembly time of the display unit of the invention can be saved effectively, and then the assembly efficiency of the portable electronic apparatus is preferred;

second, since the invention utilizes the locking structure relationship to make the panel module tightly fit with the first plate, the display unit does not need extra positioning support and fasteners. That is, the portable electronic apparatus of the invention has a lower product cost.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A portable electronic apparatus comprising:
a host;
a display unit connected to the host, the display unit comprising:
a panel module;
a first plate having a single plate body and a plurality of positioning structures provided on a surface of the single plate body, wherein the single plate body and the positioning structures are integrally formed, the panel module is disposed at the first plate by the positioning structures and tightly fits with the first plate, the surface of the single plate body faces toward the panel module, and the positioning structures restrain the panel module from moving along the surface;
and
a second plate connected to the first plate;
wherein the panel module is held between the first plate and the second plate.

2. The portable electronic apparatus according to claim 1 further comprising a plurality of buffer elements provided at the contact surface of the positioning structures and the panel module and the contact surface of the single plate body and the panel module.

3. The portable electronic apparatus according to claim 2, wherein the buffer elements are foam layers.

4. The portable electronic apparatus according to claim 1, wherein the panel module is a liquid crystal panel module.

5. The portable electronic apparatus according to claim 1, wherein a material of the first plate is plastic.

6. The portable electronic apparatus according to claim 1, wherein the first plate is a back cover and the second plate is a front cover.

7. A portable electronic apparatus comprising:
a host;
a display unit connected to the host, the display unit comprising:
a panel module;
a first plate having a single plate body and a plurality of positioning structures provided on a surface of the single plate body, wherein the single plate body and the positioning structures are integrally formed, the panel module is disposed at the first plate by the positioning structures and tightly fits with the first plate, the surface of the single plate body faces toward the panel module, and the positioning structures restrain the panel module from moving along the surface;

a second plate; and a third plate;

wherein the combination of the panel module and the first plate connects to the second plate, and the combination of the panel module and the first plate is held between the second plate and the third plate.

8. The portable electronic apparatus according to claim 7 further comprising a plurality of buffer elements provided at the contact surface of the positioning structures and the panel module and the contact surface of the second plate and the panel module.

9. The portable electronic apparatus according to claim 8, wherein the buffer elements are foam layers.

10. The portable electronic apparatus according to claim 7, wherein the panel module is a liquid crystal panel module.

11. The portable electronic apparatus according to claim 7, wherein a material of the first plate is plastic, and a material of the second plate is metal.

12. The portable electronic apparatus according to claim 7, wherein the first plate is a positioning plate, the second plate is a back cover, and the third plate is a front cover.

* * * * *